No. 637,204. Patented Nov. 14, 1899.
F. H. HEATH.
BALL BEARING.
(Application filed Aug. 27, 1897.)
(No Model.)
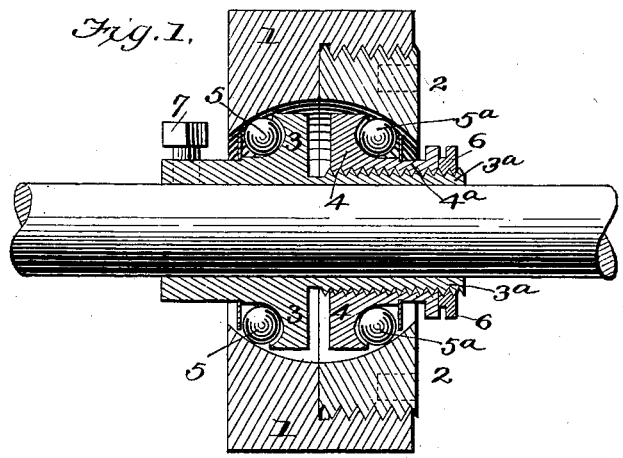
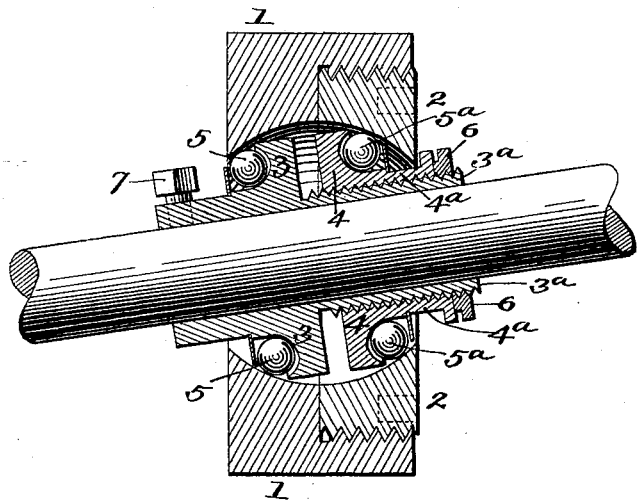
WITNESSES:
INVENTOR
Frederick H. Heath
BY Munn & Co.
ATTORNEYS.

UNITED STATES PATENT OFFICE.

FREDERICK H. HEATH, OF TACOMA, WASHINGTON.

BALL-BEARING.

SPECIFICATION forming part of Letters Patent No. 637,204, dated November 14, 1899.

Application filed August 27, 1897. Serial No. 649,687. (No model.)

*To all whom it may concern:*

Be it known that I, FREDERICK H. HEATH, a citizen of the United States, residing at Tacoma, in the county of Pierce and State of Washington, have invented a certain new and useful Improvement in Ball-Bearings, of which the following is a specification.

My invention has for its object to provide an effective arrangement whereby the cramping or binding of the balls between the bearing-surfaces is entirely overcome.

I make the bearing self-adjusting to any spring of the shaft or permanent bend therein or vibrations from unequal strains. I provide a bearing having a spherical inner surface presented to the balls, so that if the axle or shaft springs or is bent the balls will still travel in the same circular track, so that the wedging of the balls is entirely obviated and an equal and even bearing on all the balls always maintained, thus adding greatly to the smooth running and life of the bearings.

In the accompanying drawings, Figure 1 is a central transverse section of my improved bearing applied to a shaft, and Fig. 2 is a similar section showing the shaft at a different angle.

The main portion of the bearing is composed of two parts—namely, a block-like member 1, having a central transverse opening or bore, also a lateral (circular) recess, and a smaller circular block 2, which is provided with a transverse opening and fitted and screwed into the aforesaid recess, whereby the two members are firmly secured together, so as to form practically a solid block. The interior surface of the latter is formed on spherical lines whose radii have a common center. Within such spherical concavity are arranged two cones 3 and 4 and two series of loose balls 5 5$^a$, which run between the respective cones and the opposite spherical surface of the block-bearing. One cone 3 is bored to fit upon the shaft 6 and is provided with a cylindrical exteriorly-threaded extension 3$^a$, upon which the other cone 4 is screwed—that is to say, the said cone 4 has a short cylindrical extension 4$^a$, that is threaded interiorly and screwed upon the extension 3$^a$ of cone 3 and is secured in any required adjustment by a jam-nut 6.

In assembling the several parts of the bearing the block member 1 is first secured in a hanger or the like, the part 2 having been first removed to allow insertion of the cones 3 4 and series of balls 5 5$^a$. The cones, screwed together, are moved to the left into the cavity of the block 1. The block member 2 is next screwed into place. The cones 3 4 are then adjusted to secure the proper bearing for the balls 5 5$^a$—that is to say, the cone 4 is rotated upon cone 3 to adjust them apart, so as to bring the balls 5 5$^a$ into contact with and proper bearing upon the spherical inner surface of blocks 1 2. The last step is to secure the cones in their due position relatively by means of the jam-nut 6 and together upon the shaft by a clamp-screw 7.

It will be understood that the block-bearing 1 2 is to be held suspended in a hanger or otherwise fixed in position.

It will be understood that in case two or more bearings of this kind are employed on the same shaft the cones of but one of them will be secured by a clamp-screw, so that the others may be left free to allow for expansion and contraction of the shaft.

In a perfect cup-and-cone bearing each ball travels over a common path on the surface of the cone and at right angles to its axis and over a common path on the surface of the cup and at right angles to its axis. These paths are the parallel circumferences of two parallel circles. These elements constitute what are called "concentric bearings."

It is impracticable to make cup-and-cone bearings so perfect that the path of the balls shall never deviate from the circumference of a circle on either cup or cone, on account of the mechanical impossibility of making perfect threads on cup or cone and on shaft or hub, by means of which perfect alinement shall be always preserved, and for the further reason that the least vibration, spring, or bend of the shaft changes the path of the balls on the cup or cone, which path then assumes an ovoid instead of a circular form. The lockwasher and jam-nut also increase the difficulty.

The use of the spherical bearing-surface as one member of a bearing, as here shown and described, produces an absolutely concentric bearing, giving an even and uniform bearing on each ball, in which it is impossible for the balls to become cramped or pinched by vibration, spring, or bend of the shaft or by imperfection of the adjusting-threads. Fig. 2 illustrates the adaptation of such a bearing to changes in the position or angle of a shaft, and it will be seen that the balls have at all times the same circular paths, also that the relative adjustment and operation of the parts of the bearing remain the same.

What I claim is—

1. The improved bearing, formed of two members having interior concave surfaces formed on spherical lines whose radii have a common center, one of said members being provided with a lateral recess and the other member secured therein, so that they form practically one solid bearing; cones arranged within the concavity of such bearing; and loose balls held between the cones and bearing; substantially as shown and described.

2. In a ball-bearing, a block formed in two sections, one secured within the other, and having their bearing-faces concaved, a shaft, a cone thereon, said cone having an outwardly-extending flange and a threaded extension encircling the shaft, a second cone threaded on the extension and having an outwardly-extending flange, and two series of balls arranged between the cones and bearing-block, as and for the purpose described.

In testimony whereof I have hereunto affixed my signature in the presence of two subscribing witnesses.

FREDERICK H. HEATH.

Witnesses:
  E. STEINBACH,
  W. E. THEODORE.